United States Patent

Mizukoshi et al.

Patent Number: 6,034,959
Date of Patent: Mar. 7, 2000

[54] ATM SWITCH CAPABLE OF DETECTING ADDRESSING ERRORS

[75] Inventors: Nobuyuki Mizukoshi; Makoto Tawada, both of Tokyo, Japan

[73] Assignee: NEC Corporation, Tokyo, Japan

[21] Appl. No.: 08/914,800

[22] Filed: Aug. 15, 1997

[30] Foreign Application Priority Data

Aug. 16, 1996 [JP] Japan ................... 8-216284

[51] Int. Cl.[7] .................. H04L 12/28; H04L 12/56; G06F 12/00
[52] U.S. Cl. ............... 370/395; 370/395; 370/375; 370/376; 370/389; 395/425
[58] Field of Search ................... 370/375, 376, 370/395, 389, 390, 242, 244, 60, 67; 365/230; 395/425

[56] References Cited

U.S. PATENT DOCUMENTS

| | | | |
|---|---|---|---|
| 4,637,024 | 1/1987 | Dixon et al. | 371/67 |
| 4,792,942 | 12/1988 | Osato | 370/60 |
| 5,410,540 | 4/1995 | Aiki et al. | 370/60 |
| 5,535,366 | 7/1996 | Pfeiffer et al. | 395/486 |
| 5,590,278 | 12/1996 | Barthel et al. | 395/185 |
| 5,825,767 | 10/1998 | Mizukoshi et al. | 370/395 |

FOREIGN PATENT DOCUMENTS

| | | |
|---|---|---|
| 3-123238 | 5/1991 | Japan . |
| 7-321795 | 12/1995 | Japan . |
| 8-8906 | 1/1996 | Japan . |

Primary Examiner—Michael Horabik
Assistant Examiner—Man Phan
Attorney, Agent, or Firm—Foley & Lardner

[57] ABSTRACT

An ATM switch includes a multi-destination delivery number counter. The counter stores a multi-destination delivery number of each inputted cell according to destination information in the cell correlating the multi-destination delivery number with an idle address where the cell is stored, on every writing of a cell into an idle address of the shared buffer, and decrements the multi-destination delivery number of the cell on every reading of the cell from the shared buffer. The multi-destination delivery numbers of the cells are utilized for management of switching output of the cells from the shared buffer. The multi-destination delivery number counter detects addressing errors to the shared buffer according to the multi-destination delivery numbers, on every inputting or outputting of the cells. According to the ATM switch, both miniaturization of circuit scale of the ATM switch and improvement of reliability of the ATM switch are made possible.

7 Claims, 3 Drawing Sheets

F I G. 1
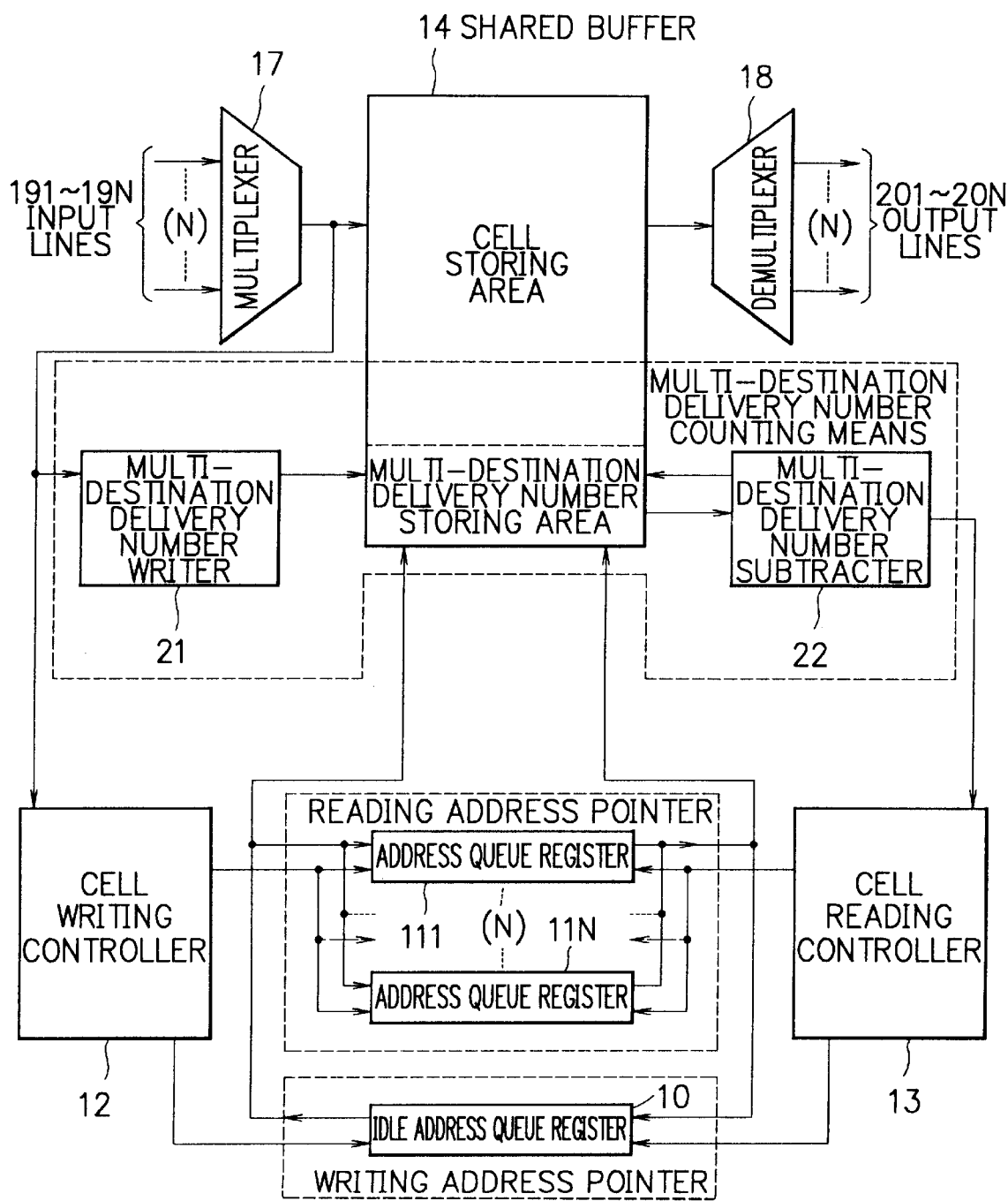

ATM SWITCH CAPABLE OF DETECTING ADDRESSING ERRORS

BACKGROUND OF THE INVENTION

The present invention relates to an ATM(Asynchronous Transfer Mode) switch used in ATM networks, and in particular, to an ATM switch utilizing a shared buffer for temporarily holding and outputting cells, which is provided with functions for detecting addressing errors to the shared buffer.

DESCRIPTION OF THE RELATED ART

In ATM(Asynchronous Transfer Mode) networks, ATM switches are utilized as network elements provided with multi-destination delivery functions for sending inputted cells, i.e. communicated data of fixed length, into plural output lines. An ATM switch provided with a shared buffer for storing cells is connected to plural input lines and output lines, and temporarily stores cells inputted via the input lines in the shared buffer, and executes switching output of the cells into appropriate output lines according to destination information in the cells.

FIG. 1 is a block diagram showing construction of an ATM switch which is presently proposed by the present inventors. The ATM switch comprises an idle address queue register 10, address queue registers 111–11N, a cell writing controller 12, a cell reading controller 13, a shared buffer 14, a multiplexer 17, a demultiplexer 18, a multi-destination delivery number writer 21, and a multi-destination delivery number subtracter 22.

The idle address queue register 10 is a queue register for storing and outputting a queue of idle addresses of the shared buffer 14. When inputted cells are written into the shared buffer 14 in the order of input, the idle address queue register 10 functions as an address pointer for the cells to be written into the shared buffer 14. When switching output of a cell into appropriate output lines 201–20N has been completed, reading address which has been read out from the address queue registers 111–11N, i.e. the buffer address where the cell has been stored is then stored in the idle address queue register 10 as an idle address of the shared buffer 14.

The address queue registers 111–11N are queue registers provided corresponding to each output line 201–20N for storing and outputting a queue of reading addresses of the cells in the shared buffer 14. When a cell is read out from the shared buffer 14 and sent to output lines 201–20N, the address queue registers 111–11N function as address pointers for the cell being read out from the shared buffer 14. When an inputted cell is written into the shared buffer 14, writing address of the cell is stored as reading address of itself to be used at the point of reading out, into the address queue registers 111–11N corresponding to destination information in the cell.

The cell writing controller 12 controls writing of inputted cells in the order of input into idle addresses of the shared buffer 14. When an inputted cell is written into the shared buffer 14, the cell writing controller 12 sends an idle address stored in the idle address queue register 10 to the shared buffer 14 as a writing address for the inputted cell, and stores this writing address in the address queue registers 111–11N corresponding to destination information in the cell as a reading address of the cell to be used at the point of reading out. In the case where the destination information in an inputted cell is multi-destination information of plural destinations for multi-destination delivery, the cell writing controller 12 stores the writing address of the inputted cell simultaneously in plural address queue registers 111–11N corresponding to the multi-destination information of the cell as a reading address of the cell to be used at the point of reading out.

The cell reading controller 13 controls reading of the cells temporarily stored in the shared buffer 14 and sending the cells into the output lines 201–20N. When a cell stored in the shared buffer 14 is read out, the cell reading controller 13 sends a reading address stored in one of the address queue registers 111–11N into the shared buffer 14, along with judging whether or not switching output of the cell into the output lines 201–20N has been completed according to output value of the multi-destination delivery number subtracter 22. If the switching output of the cell has been completed, the cell reading controller 13 stores the reading address of the cell in the idle address queue register 10 as an idle address of the shared buffer 14.

The shared buffer 14 is a buffer memory for receiving cells, i.e. communicated data of fixed length, and temporarily storing them, utilizing the idle address queue register 10 as an address pointer for the cells to be written in to itself and utilizing the address queue registers 111–11N as address pointers for the cells to be read out from itself. In this example, the shared buffer 14 includes a cell storing area for storing inputted cells and a multi-destination delivery number storing area for storing the number of times of multi-destination delivery of each cell according to multi-destination information in each cell. The number (the multi-destination delivery number) for a cell, stored in the multi-destination delivery number storing area is decremented when the cell is read out from the cell storing area of the shared buffer 14 and outputted into one of the output lines 201–20N.

The multiplexer 17 receives cells via the input lines 191–19N and sends the cells into the shared buffer 14. The demultiplexer 18 outputs the cells read out from the shared buffer 14 into the output lines 201–20N.

The multi-destination delivery number writer 21, the multi-destination delivery number subtracter 22, and the multi-destination delivery number storing area in the shared buffer 14 compose a multi-destination delivery number counter means for counting the multi-destination delivery number of each cell. On every writing of each inputted cell into the cell storing area of the shared buffer 14, the multi-destination delivery number writer 21 writes into the multi-destination delivery number storing area of the shared buffer 14 the numbers of times of multi-destination delivery of the inputted cell (the multi-destination delivery number) according to multi-destination information in the cell. And on every reading of the cell from the shared buffer 14, the multi-destination delivery number subtracter 22 reads out the multi-destination delivery number stored in the shared buffer 14, decrements the number, and writes the decremented number into the shared buffer 14. In this example, this multi-destination delivery number indicates remaining number of times to further execute multi-destination delivery of the cell, and it becomes zero when switching output of the cell into the output lines 201–20N is completed.

The operation of the ATM switch shown in FIG. 1 will be briefly described next. A cell inputted via one of the input lines 191–19N passes through the multiplexer 17 and is written into the cell storing area of the shared buffer 14. In this process, the idle address queue register 10 is utilized as an address pointer for the cell to be written into the shared buffer 14. Writing address of each cell at above writing process is stored in address queue registers 111–11N corresponding to destination information in the cell as a reading address to be used at the point of reading out of the cell. In the case where destination information in an inputted cell is multi-destination information including plural destinations for multi-destination delivery, the writing address of the inputted cell is simultaneously stored in plural address queue registers 11l–11N corresponding to the multi-destination information of the cell as a reading address of the cell to be used at the point of reading out. Meanwhile, on every writing of inputted cells into the shared buffer 14, multi-destination delivery numbers according to multi-destination information in the cells are written into the multi-destination delivery number storing area of the shared buffer 14 by the multi-destination delivery number writer 21.

When a cell stored in the shared buffer 14 is switching-outputted into one of the output lines 201–20N, the writing address i.e. the reading address of the cell at the point of reading out, stored in one of address queue registers 11l–11N corresponding to the output line is sent to the shared buffer 14, and the cell is read out from the reading address of the shared buffer 14. The cell read out from the shared buffer 14 is then outputted into one of the output lines 201–20N corresponding to the address queue register. Meanwhile, on every reading of the cell from the shared buffer 14, the multi-destination delivery number of the cell is read out from the multi-destination delivery number storing area of the shared buffer 14, decremented, and written back by the multi-destination delivery number subtracter 22. At this point, if the decremented multi-destination delivery number has come to zero, i.e. if switching output of the cell into output lines 201–20N is completed, the reading address which has been used for reading the cell is stored in the idle address queue register 10 as an idle address of the shared buffer 14. The idle address is reutilized later as a writing address for another inputted cell.

As described above, the ATM switch proposed by the present inventors is provided with the multi-destination delivery number counter means and is capable of managing multi-destination delivery of cells by use of the multi-destination delivery number.

FIG. 2 is a block diagram showing an example of construction of a conventional ATM switch which is disclosed in Japanese Patent Laid-Open Publication No. 7-321795.

The ATM switch in FIG. 2 comprises a shared buffer 34, a multiplexer 35, and a demultiplexer 36. The shared buffer 34 is connected to input lines 37(371–37N) via the multiplexer 35 and is connected to output lines 38(381–38N) via the demultiplexer 36. The ATM switch further comprises address queue registers 31(311–31N). writing buffer address registers 32(321–32N), and reading buffer address registers 33(331–33N), which are provided corresponding to the plural output lines 38(381–38N). Reading out from an address queue register 31 is executed via a corresponding writing buffer address register 32, and writing into an address queue register 31 is executed via a corresponding reading buffer address register 33. In other words, an address written into an address queue register 31 is temporarily stored in a corresponding writing buffer address register 32 and then written into the address queue register 31, and an address read out from an address queue register 31 is temporarily stored in a corresponding reading buffer address register 33 and then outputted. The ATM switch further comprises an idle address queue register 30 which is connected to a buffer address management section 40. The buffer address management section 40 includes a buffer address usage status storing section 41, status value inspecting sections 42a and 42b, abnormal buffer address disposing sections 43a and 43b, status value registering sections 44a and 44b, and management controlling sections 45a and 45b.

In the following, the operation of the ATM switch shown in FIG. 2 will be described. A cell inputted via a input line 37 goes through the multiplexer 35 and is stored at a place in the shared buffer 34 indicated by an buffer address read out from the idle address queue register 30. In the above process, a buffer address read out from the idle address queue register 30 is controlled by the management controlling section 45a. More concretely, the status value inspecting section 42a refers to the buffer address usage status storing section 41, and if usage status of the buffer address read out from the idle address queue register 30 is 'unused', the buffer address is judged to be normal or correct. Then, the normal buffer address is registered as 'used' in the buffer address usage status storing section 41 by the status value registering section 44a, and is written into the address queue registers 31 by the writing buffer address registers 32, and the cell is stored at the place in the shared buffer 34 indicated by the buffer address. If usage status of the buffer address read out from the idle address queue register 30 is 'used', the buffer address is judged to be abnormal or incorrect. Then, the abnormal buffer address is disposed of or abandoned by the abnormal buffer address disposing sections 43a.

When a cell stored in the shared buffer 34 is switching-outputted into output lines 38, the buffer address of the cell is outputted from the address queue registers 31 to the shared buffer 34 via the reading buffer address registers 33, and the cell stored at the buffer address in the shared buffer 34 is outputted into the output lines 38 via the demultiplexer 36. In the above process, a buffer address read out from address queue registers 31 corresponding to each output line 38 is controlled by the management controlling section 45b. More concretely, the status value inspecting section 42b refers to the buffer address usage status storing section 41, and if usage status of a buffer address read out from an address queue register 31 is 'used', the buffer address is judged to be normal or correct. Then, the normal buffer address is registered as 'unused' in the buffer address usage status storing section 41 by the status value registering section 44b, and a cell stored at the buffer address in the shared buffer 34 is outputted into an output line corresponding to the address queue register 31. If usage status of the buffer address read out from the address queue register 31 is 'unused', the buffer address is judged to be abnormal or incorrect. Then, the abnormal buffer address is disposed of or abandoned by the abnormal buffer address disposing sections 43b.

As described above, the conventional ATM switch in FIG. 2 is capable of detecting addressing errors to the shared buffer 34, such as bit errors in buffer addresses, duplicate addressing, etc. by the use of the buffer address usage status storing section 41 etc.

However, in the above conventional ATM switch, detection of addressing errors to the shared buffer 34 is executed by providing the buffer address usage status storing section 41 for indicating used/unused status of every buffer address to be used in the ATM switch, in other words, additional memory devices etc. are needed to be provided to the ATM switch in order to detect addressing errors, therefore the circuit scale of the ATM switch is necessitated to be large.

SUMMARY OF THE INVENTION

It is therefore the primary object of the present invention to provide an ATM switch of small circuit scale and improved reliability which is provided with functions for detecting addressing errors to the shared buffer.

In accordance with the present invention, there is provided an ATM switch comprising a multi-destination delivery number counting means. The multi-destination delivery number counting means stores a multi-destination delivery number of each inputted cell according to destination information in the cell correlating the multi-destination delivery number with an idle address where the cell is stored, on every writing of a cell into an idle address of the shared buffer, and decrements the multi-destination delivery number of the cell on every reading of the cell from the shared buffer. The multi-destination delivery numbers of the cells are utilized for management of switching output of the cells from the shared buffer. The multi-destination delivery number counting means detects addressing errors to the shared buffer according to the multi-destination delivery numbers, on every inputting or outputting of the cells.

In accordance with one aspect of the present invention, the multi-destination delivery number counting means includes a multi-destination delivery number inspecting means on the input side. The multi-destination delivery number inspecting means on the input side inspects whether or not the multi-destination delivery number corresponding to an idle address for storage of an inputted cell is zero, on every storing of a cell in an idle address of the shared buffer.

In accordance with another aspect of the present invention, the multi-destination delivery number counting means includes a multi-destination delivery number inspecting means on the output side. The multi-destination delivery number inspecting means on the output side inspects whether or not the multi-destination delivery number corresponding to a reading address of a cell is greater than zero on every reading and outputting of the cell from the shared buffer into an output line corresponding to destination information in the cell.

In accordance with another aspect of the present invention, the ATM switch may further comprise an idle address queue register for storing a queue of idle addresses of the shared buffer, address queue registers provided corresponding to each output line for storing a queue of reading addresses of the cells in the shared buffer, and a cell writing control means. The cell writing control means sends an idle address stored in the idle address queue register to the shared buffer as a writing address for an inputted cell when the cell is written into the shared buffer, and stores the writing address in the address queue registers corresponding to destination information in the cell as a reading address of the cell to be used at the point of reading out. In the case where the multi-destination delivery number inspected by the multi-destination delivery number inspecting means on the input side is not zero, the cell writing control means judges that some addressing errors to the shared buffer have occurred and does not send the idle address correlated with the multi-destination delivery number to the shared buffer as a writing address of the cell to be written into the shared buffer.

In accordance with another aspect of the present invention, the ATM switch may further comprise an idle address queue register for storing a queue of idle addresses of the shared buffer, address queue registers provided corresponding to each output line for storing a queue of reading addresses of the cells in the shared buffer, and a cell reading control means. The cell reading control means sends a reading address stored in one of the address queue registers into the shared buffer when a cell stored in the shared buffer is read out, along with judging whether or not switching output of the cell into the output lines has been completed according to the multi-destination delivery number. If the switching output of the cell has been completed, the cell reading control means stores the reading address of the cell in the idle address queue register as an idle address of the shared buffer. In the case where the multi-destination delivery number inspected by the multi-destination delivery number inspecting means on the output side is zero, the cell reading control means judges that some addressing errors to the shared buffer have occurred and does not store the reading address at the point of reading out of the cell in the idle address queue register as an idle address of the shared buffer.

In accordance with another aspect of the present invention, the cell writing control means may send the next idle address stored in the idle address queue register into the shared buffer as a writing address of the cell to be written into the shared buffer, in the case where the multi-destination delivery number inspected by the multi-destination delivery number inspecting means on the input side is not zero.

In accordance with another aspect of the present invention, the ATM switch may comprise the multi-destination delivery number inspecting means both on the input side and on the output side, and both the cell writing control means and the cell reading control means.

BRIEF DESCRIPTION OF THE DRAWINGS

The objects and features of the present invention will become more apparent from the consideration of the following detailed description taken in conjunction with the accompanying drawings, in which:

FIG. 1 is a block diagram showing construction of an ATM switch which is presently proposed by the present inventors;

DESCRIPTION OF THE PREFERRED EMBODIMENTS

Figure 2:
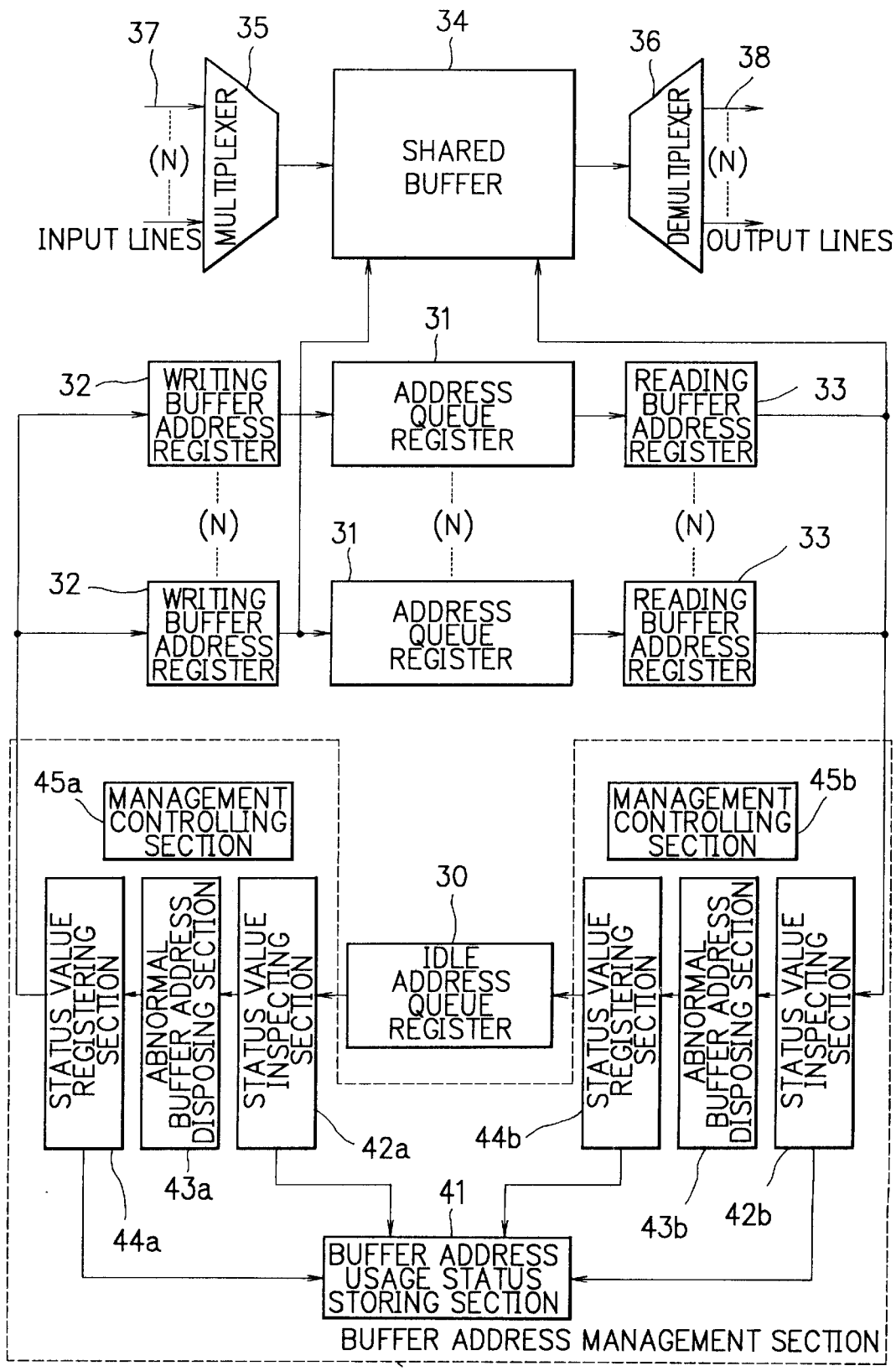
FIG. 2 is a block diagram showing construction of a conventional ATM switch.
Figure 3:
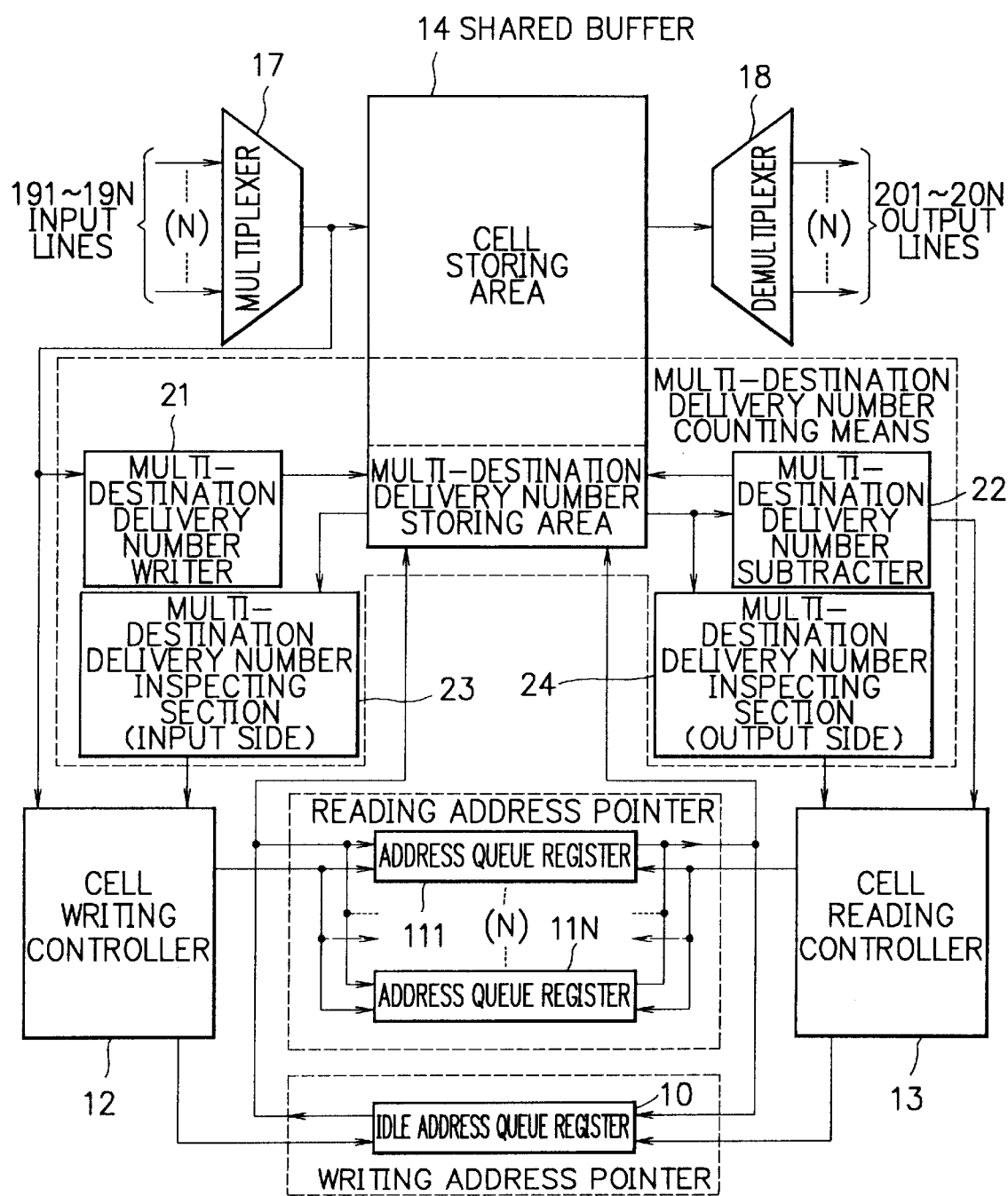
FIG. 3 is a block diagram showing an embodiment of the present invention.

Referring now to FIG. 3, a description will be given in detail of a method and an apparatus in accordance with the present invention. FIG. 3 shows construction of an embodiment of the present invention. In FIG. 3, the ATM switch comprises an idle address queue register 10, address queue registers 111–11N, a cell writing controller 12, a cell reading controller 13, a shared buffer 14 including a cell storing area and a multi-destination delivery number storing area, a multiplexer 17, a demultiplexer 18, and a multi-destination delivery number counter means in the same way as the ATM switch shown in FIG. 1 which is presently proposed by the present inventors.

The multi-destination delivery number counter means of this embodiment includes a multi-destination delivery number writer 21 and a multi-destination delivery number subtracter 22 similarly to the ATM switch in FIG. 1, and further includes a multi-destination delivery number inspecting section 23 on the input side and a multi-destination delivery number inspecting section 24 on the output side.

Functions of each section other than those of the multi-destination delivery number inspecting section 23 and 24 are the same or similar to those of the ATM switch in FIG. 1 as follows.

The idle address queue register 10 stores and outputs a queue of idle addresses of the shared buffer 14. When inputted cells are written into the shared buffer 14 in the order of input, the idle address queue register 10 functions as an address pointer for the cells to be written into the shared buffer 14. When switching output of a cell into appropriate output lines 201–20N has been completed, reading address which has been read out from the address queue registers 111–11N, i.e. the buffer address where the cell has been stored is then stored in the idle address queue register 10 as an idle address of the shared buffer 14.

The address queue registers 111–11N are provided correspondingly to each output line 201–20N for storing and outputting a queue of reading addresses of the cells in the shared buffer 14. When a cell is read out from the shared buffer 14 and sent to output lines 201–20N, the address queue registers 111–11N function as address pointers for the cell being read out from the shared buffer 14. When an inputted cell is written into the shared buffer 14, writing address of the cell is stored as reading address of itself to be used at the point of reading out, into the address queue registers 111–11N corresponding to destination information in the cell.

The cell writing controller 12 controls writing of inputted cells in the order of input into idle addresses of the shared buffer 14. When an inputted cell is written into the shared buffer 14, the cell writing controller 12 sends an idle address stored in the idle address queue register 10 to the shared buffer 14 as a writing address for the inputted cell, and stores this writing address in the address queue registers 111–11N corresponding to destination information in the cell as a reading address of the cell to be used at the point of reading out. In the case where the destination information in an inputted cell is multi-destination information of plural destinations for multi-destination delivery, the cell writing controller 12 stores the writing address of the inputted cell simultaneously in plural address queue registers 111–11N corresponding to the multi-destination delivery information of the cell as a reading address of the cell to be used at the point of reading out. The cell writing controller 12 in this embodiment is provided with further functions related to the multi-destination delivery number inspecting section 23 and the functions will be described later.

The cell reading controller 13 controls reading of the cells temporarily stored in the shared buffer 14 and sending the cells into the output lines 201–20N. When a cell stored in the shared buffer 14 is read out, the cell reading controller 13 sends a reading address stored in one of the address queue registers 111–11N into the shared buffer 14, along with judging whether or not switching output of the cell into the output lines 201–20N has been completed according to output value of the multi-destination delivery number subtracter 22. If the switching output of the cell has been completed, the cell reading controller 13 stores the reading address of the cell in the idle address queue register 10 as an idle address of the shared buffer 14. The cell reading controller 13 in this embodiment is provided with further functions related to the multi-destination delivery number inspecting section 24 and the functions will be described later.

The shared buffer 14 is a buffer memory for receiving cells and temporarily storing them, utilizing the idle address queue register 10 as an address pointer for the cells to be written in to itself and utilizing the address queue registers 111–11N as address pointers for the cells to be read out from itself. The shared buffer 14 in this embodiment includes a cell storing area for storing inputted cells and a multi-destination delivery number storing area for storing the multi-destination delivery number of each cell. The multi-destination delivery number for a cell stored in the multi-destination delivery number storing area is decremented when the cell is read out from the cell storing area of the shared buffer 14 and outputted into one of the output lines 201–20N.

The multiplexer 17 receives cells via the input lines 191–19N and sends the cells into the shared buffer 14. The demultiplexer 18 outputs the cells read out from the shared buffer 14 into the output lines 201–20N.

The multi-destination delivery number writer 21, the multi-destination delivery number subtracter 22, and the multi-destination delivery number storing area in the shared buffer 14 compose a multi-destination delivery number counter means for counting the multi-destination delivery number of each cell. On every writing of each inputted cell into the cell storing area of the shared buffer 14, the multi-destination delivery number writer 21 writes into the multi-destination delivery number storing area of the shared buffer 14 the numbers of times of multi-destination delivery of the inputted cell (the multi-destination delivery number) according to multi-destination information in the cell. And on every reading of the cell from the shared buffer 14, the multi-destination delivery number subtracter 22 reads out the multi-destination delivery number stored in the shared buffer 14, decrements the number, and writes the decremented number into the shared buffer 14. Remaining number of times to further execute multi-destination delivery of the cell is indicated by the multi-destination delivery number, and when the number has come to zero, switching output of the cell into the output lines 201–20N is finished.

The functions of the sections described above are the same or similar to those of the ATM switch in FIG. 1 which is presently proposed by the present inventors, therefore, the ATM switch of this embodiment is provided with the multi-destination delivery number counter means and is capable of managing multi-destination delivery of cells by use of the multi-destination delivery number.

In the following, functions of the multi-destination delivery number inspecting section 23,24 and related sections will be described.

Before a cell is written into the shared buffer 14 according to an idle address read out from the idle address queue register 10, the multi-destination delivery number inspecting section 23 reads out a multi-destination delivery number corresponding to the idle address read out from the idle address queue register 10, from the multi-destination delivery number storing area of the shared buffer 14, judges whether or not the number is zero, and outputs the result into the cell writing controller 12. If the multi-destination delivery number is not zero, the cell writing controller 12 judges that some addressing errors have occurred. Then, the cell writing controller 12 does not output the idle address as a writing address of the cell inputted into the shared buffer 14, but outputs the next idle address stored in the idle address queue register 10 into the shared buffer 14 as a writing address of the inputted cell, along with writing the writing address into address queue registers 111–11N corresponding to destination information in the inputted cell as an reading address to be used at the point of reading out of the cell. At this point, an alarm signal indicating the occurrence of addressing error in the ATM switch may be outputted.

On the other hand, on every reading out of a cell from the shared buffer 14 and outputting of the cell into output lines 201–20N corresponding to multi-destination information in the cell, the multi-destination delivery number inspecting section 24 on the output side reads out a multi-destination delivery number of the cell from the multi-destination delivery number storing area of the shared buffer 14, judges whether or not the number is zero, and outputs the result to the cell reading controller 13. If the multi-destination delivery number is zero, the cell writing controller 13 judges that some addressing errors have occurred. Then, the cell writing controller 13 does not store the reading address at the point of reading out of the cell in the idle address queue register 10 as an idle address of the shared buffer 14, and the address will not be reused later as a writing address for inputted cells. At this point, an alarm signal indicating the occurrence of addressing error in the ATM switch may be outputted.

In the following, the operation of this embodiment will be described in detail referring to FIG. 3.

In the ATM switch, a multi-destination delivery number for a cell stored at a buffer address in the shared buffer 14 is stored in the multi-destination delivery number storing area in the shared buffer 14. The multi-destination delivery number 'zero' corresponds to unused status of the buffer address, and 'greater than zero' corresponds to used status of the buffer address. Therefore, the multi-destination delivery number storing area in the shared buffer 14 is initialized to zeros before starting switching operation of the ATM switch.

The operation when a cell is inputted to the ATM switch will be described first. A cell inputted via one of input lines 191–19N goes through the multiplexer 17 and if an idle address read out from the idle address queue register 10 is 'correct', the idle address is used as an writing address for the cell and the cell is written into the writing address in the cell storing area of the shared buffer 14.

More concretely, a multi-destination delivery number, which has been stored at an address of the multi-destination delivery number storing area corresponding to the idle address of the cell storing area, is inspected by the multi-destination delivery number inspecting section 23, and if the number is zero, it is judged that the idle address is unused i.e. the idle address is 'correct'. Then, the idle address is used as a writing address and the inputted cell is written into the writing address in the cell storing area of the shared buffer 14, a multi-destination delivery number according to multi-destination information in the inputted cell is written into the multi-destination delivery number storing area in the shared buffer 14 by the multi-destination delivery number writer 21, and the writing address is stored in address queue registers 111–11N corresponding to every destination as an reading address to be used at the point of reading out of the cell. On the other hand, if the multi-destination delivery number inspected by the multi-destination delivery number inspecting section 23 is not zero, it is judged that the idle address read out from the idle address queue register 10 is used i.e. the idle address is 'incorrect', and thus some addressing errors have occurred.

The operation when a cell is outputted from the ATM switch will be described next. An reading address read out from one of address queue registers 111–11N is sent to the shared buffer 14, and if the reading address is 'correct', a cell stored at the reading address of the shared buffer 14 is read out and outputted via the demultiplexer 18 into one of output lines 201–20N corresponding to the address queue register.

More concretely, a multi-destination delivery number, which has been stored at an address of the multi-destination delivery number storing area corresponding to the reading address of the cell storing area, is inspected by the multi-destination delivery number inspecting section 24 on the output side, and if the number is not zero, it is judged that the reading address is used i.e. the reading address is 'correct'. Then, the multi-destination delivery number is decremented and written back to the multi-destination delivery number storing area by the multi-destination delivery number subtracter 22, and a cell stored at the reading address is read out and outputted into one of output lines 201–20N corresponding to the address queue register. At this point, if the decremented multi-destination delivery number has come to zero, i.e. the cell has been outputted into every output line 201–20N corresponding to multi-destination information in the cell, the reading address is stored in the idle address queue register 10 as an idle address of the shared buffer 14. On the other hand, if the multi-destination delivery number inspected by the multi-destination delivery number inspecting section 24 is zero, it is judged that the reading address read out from the address queue register is unused i.e. the reading address is 'incorrect', and thus some addressing errors have occurred.

In this embodiment, in the multi-destination delivery number storing area composing the multi-destination delivery number counting means, the multi-destination delivery number 'zero' is stored when a buffer address for storing a cell is unused and 'greater than zero' is stored when the buffer address is used. By use of this multi-destination delivery number counting means, and without additional memory devices such as the buffer address usage status storing section 41 etc. in the conventional ATM switch, management of switching output of the cells from the shared buffer 14 and monitoring of usage statuses of addresses in the shared buffer 14, along with detection of addressing errors to the shared buffer 14, is made possible.

For example, in the case where the shared buffer 14, along with the idle address queue register 10 and the address queue registers 111–11N, is formed of RAM(Random Access Memory) devices, detection of addressing errors to the shared buffer 14 is possible even when malfunction due to soft errors etc. occurred in somewhere in the RAM devices, therefore, according to this embodiment, both miniaturization of circuit scale of the ATM switch and improvement of reliability of the ATM switch are made possible.

Incidentally, although there were provided both a multi-destination delivery number inspecting section 23 on the input side and a multi-destination delivery number inspecting section 24 on the output side in the above embodiment shown in FIG. 3, only a multi-destination delivery number inspecting section 24 on the output side may be provided in another embodiment. In this embodiment, the aforementioned initialization of the multi-destination delivery number storing area in the shared buffer 14 is unnecessary, and further simplification and miniaturization of circuit scale is possible. Moreover, simplification of circuit scale by providing only a multi-destination delivery number inspecting section 23 on the input side is also possible.

As set forth hereinabove, by the ATM switch according to the present invention, switching output of cells from the shared buffer is managed by use of the multi-destination delivery numbers counted by the multi-destination delivery number counting means, and additional memory devices for storing used/unused status of buffer addresses in the shared buffer are not necessary in order to detect addressing errors to the shared buffer, since the multi-destination delivery number counting means in the shared buffer type ATM switch is utilized for not only counting the multi-destination delivery number of cells but also judgment of used/unused status of buffer addresses in the shared buffer. Therefore, both miniaturization of circuit scale of the ATM switch and improvement of reliability of the ATM switch are made possible.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An ATM switch for receiving cells via plural input lines and executing switching output-of the inputted cells into output lines corresponding to destination information in the cells, comprising:

a shared buffer for receiving the cells in the order of input and storing the cells in idle addresses thereof; and a multi-destination delivery number counter for storing a multi-destination delivery number of each inputted cell according to destination information in the cell correlating the multi-destination delivery number with an idle address where the cell is stored, on every writing of a cell into an idle address of the shared buffer, and decrementing the multi-destination delivery number of the cell on every reading of the cell from the shared buffer, the multi-destination delivery numbers of the cells being utilized for management of the switching output of the cells from the shared buffer, said multi-destination delivery number counter detecting addressing errors to the shared buffer according to the multi-destination delivery numbers, on every inputting or outputting of the cells.

2. An ATM switch as claimed in claim 1, wherein said multi-destination delivery number counter includes a multi-destination delivery number inspector on an input side for inspecting whether or not the multi-destination delivery number corresponding to an idle address for storage of an inputted cell is zero on every storing of a cell in an idle address of the shared buffer.

3. An ATM switch as claimed in claim 1, wherein said multi-destination delivery number counter includes a multi-destination delivery number inspector on an output side for inspecting whether or not the multi-destination delivery number corresponding to a reading address of a cell is greater than zero on every reading and outputting of the cell from the shared buffer into an output line corresponding to destination information in the cell.

4. An ATM switch for receiving cells via plural input lines and executing switching output of the inputted cells into output lines corresponding to destination information in the cells, said ATM switch comprising:

a shared buffer for receiving the cells in the order of input and storing the cells in idle addresses thereof; and a multi-destination delivery number counter for storing a multi-destination delivery number of each inputted cell according to destination information in the cell correlating the multi-destination delivery number with an idle address where the cell is stored, on every writing of a cell into an idle address of said shared buffer, and decrementing the multi-destination delivery number of the cell on every reading of the cell from said shared buffer, the multi-destination delivery numbers of the cells being utilized for management of the switching output of the cells from said shared buffer;

said multi-destination delivery number counter detecting addressing errors to said shared buffer according to the multi-destination delivery numbers, on every inputting or outputting of the cells;

wherein said multi-destination delivery number counter includes a multi-destination delivery number inspector on an input side for inspecting whether or not the multi-destination delivery number corresponding to an idle address for storage of an inputted cell is zero on every storing of a cell in an idle address of said shared buffer;

said ATM switch further comprising:

an idle address queue register for storing a queue of idle addresses of said shared buffer;

address queue registers provided corresponding to each output line for storing a queue of reading addresses of the cells in said shared buffer; and a cell writing controller for sending an idle address stored in the idle address queue register to said shared buffer as a writing address for an inputted cell when the cell is written into said shared buffer, and storing the writing address in the address queue registers corresponding to destination information in the cell as a reading address of the cell to be used at the point of reading out;

in the case where the multi-destination delivery number inspected by said multi-destination delivery number inspector on the input side is not zero, said cell writing controller judging that some addressing errors to said shared buffer have occurred and does not send the idle address correlated with the multi-destination delivery number to said shared buffer as a writing address of the cell to be written into said shared buffer.

5. An ATM switch as claimed in claim 4, wherein the cell writing control means sends the next idle address stored in the idle address queue register into said shared buffer as a writing address of the cell to be written into said shared buffer, in the case where the multi-destination delivery number inspected by the multi-destination delivery number inspector on the input side is not zero.

6. An ATM switch for receiving cells via plural input lines and executing switching output of the inputted cells into output lines corresponding to destination information in the cells, said ATM switch comprising:

a shared buffer for receiving the cells in the order of input and storing the cells in idle addresses thereof; and a multi-destination delivery number counter for storing a multi-destination delivery number of each inputted cell according to destination information in the cell correlating the multi-destination delivery number with an idle address where the cell is stored, on every writing of a cell into an idle address of said shared buffer, and decrementing the multi-destination delivery number of the cell on every reading of the cell from said shared buffer, the multi-destination delivery numbers of the cells being utilized for management of the switching output of the cells from said shared buffer;

said multi-destination delivery number counter detecting addressing errors to said shared buffer according to the multi-destination delivery numbers, on every inputting or outputting of the cells;

wherein said multi-destination delivery number counter includes a multi-destination delivery number inspector on an output side for inspecting whether or not the multi-destination delivery number corresponding to a reading address of a cell is greater than zero on every reading and outputting of the cell from said shared buffer into an output line corresponding to destination information in the cell;

said ATM switch further comprising;

an idle address queue register for storing a queue of idle addresses of said shared buffer;

address queue registers provided corresponding to each output line for storing a queue of reading addresses of the cells in said shared buffer; and a cell reading controller for sending a reading address stored in one of the address queue registers into said shared buffer when a cell stored in said shared buffer is read out, along with judging whether or not switching output of the cell into the output lines has been completed according to the multi-destination delivery number, and storing the reading address of the cell in the idle address queue register as an idle address of said shared buffer if the switching output of the cell has been completed;

in the case where the multi-destination delivery number inspected by said multi-destination delivery number inspector on the output side is zero, said cell reading controller judging that some addressing errors to said shared buffer have occurred and does not store the reading address at the point of reading out of the cell in the idle address queue register as an idle address of said shared buffer.

7. An ATM switch for receiving cells via plural input lines and executing switching output of the inputted cells into output lines corresponding to destination information in the cells, said ATM switch comprising:

a shared buffer for receiving the cells in the order of input and storing the cells in idle addresses thereof; and a multi-destination delivery number counter for storing a multi-destination delivery number of each inputted cell according to destination information in the cell correlating the multi-destination delivery number with an idle address where the cell is stored, on every writing of a cell into an idle address of said shared buffer, and decrementing the multi-destination delivery number of the cell on every reading of the cell from said shared buffer, the multi-destination delivery numbers of the cells being utilized for management of the switching output of the cells from said shared buffer;

said multi-destination delivery number counter detecting addressing errors to said shared buffer according to the multi-destination delivery numbers, on even inputting or outputting of the cells;

said ATM switch further comprising:

an idle address queue register for storing a queue of idle addresses of said shared buffer;

address queue registers provided corresponding to each output line for storing a queue of reading addresses of the cells in said shared buffer;

a multi-destination delivery number inspector on an input side for inspecting whether or not the multi-destination delivery number corresponding to an idle address for storage of an inputted cell is zero on every storing of a cell in an idle address of said shared buffer;

a multi-destination delivery number inspecting means on an output side for inspecting whether or not the multi-destination delivery number corresponding to a reading address of a cell is greater than zero on every reading and outputting of the cell from said shared buffer into an output line corresponding to destination information in the cell;

a cell writing controller for sending an idle address stored in the idle address queue register to said shared buffer as a writing address for an inputted cell when the cell is written into said shared buffer, and storing the writing address in the address queue registers corresponding to destination information in the cell as a reading address of the cell to be used at the point of reading out; and a cell reading controller for sending a reading address stored in one of the address queue registers into said shared buffer when a cell stored in said shared buffer is read out, along with judging whether or not switching output of the cell into the output lines has been completed according to the multi-destination delivery number, and storing the reading address of the cell in the idle address queue register as an idle address of said shared buffer if the switching output of the cell has been completed;

in the case where the multi-destination delivery number inspected by the multi-destination delivery number inspector on the input side is not zero, the cell writing controller judging that some addressing errors to said shared buffer have occurred and does not send the idle address correlation with the multi-destination delivery number to said shared buffer as a writing address of the cell to be written into said shared buffer; and in the case where the multi-destination delivery number inspected by the multi-destination delivery number inspector on the output side is zero, the cell reading controller judging that some addressing errors to said shared buffer have occurred and does not store the reading address at the point of reading out of the cell in the idle address queue register as an idle address of said shared buffer.

* * * * *